(12) United States Patent
Chen

(10) Patent No.: US 10,409,393 B2
(45) Date of Patent: Sep. 10, 2019

(54) IMAGE PROCESSING METHOD CAPABLE OF DETECTING NOISE AND RELATED NAVIGATION DEVICE

(71) Applicant: PixArt Imaging Inc., Hsin-Chu (TW)

(72) Inventor: Chun-Wei Chen, Sunnyvale, CA (US)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 16/150,290

(22) Filed: Oct. 3, 2018

(65) Prior Publication Data

US 2019/0033986 A1    Jan. 31, 2019

Related U.S. Application Data

(63) Continuation-in-part of application No. 15/800,079, filed on Nov. 1, 2017, now Pat. No. 10,120,459, which is a continuation of application No. 14/793,747, filed on Jul. 8, 2015, now Pat. No. 9,836,132.

(30) Foreign Application Priority Data

Mar. 10, 2015    (TW) .............................. 104107633 A

(51) Int. Cl.
*G06F 3/03* (2006.01)

(52) U.S. Cl.
CPC .................................. *G06F 3/0317* (2013.01)

(58) Field of Classification Search
CPC ........ G06F 3/0304; G06F 3/0317; G09G 5/00
USPC ............... 250/208.1, 221, 205; 345/163, 166
See application file for complete search history.

(56) References Cited

U.S. PATENT DOCUMENTS

| 7,038,820 | B1 | 5/2006 | Kindt |
| 9,836,132 | B2 | 12/2017 | Chen |
| 2006/0044267 | A1* | 3/2006 | Xie ..................... G06F 3/03543 345/157 |
| 2011/0148764 | A1 | 6/2011 | Gao |
| 2014/0210722 | A1 | 7/2014 | Chen |
| 2015/0146089 | A1 | 5/2015 | Ovsiannikov |

\* cited by examiner

*Primary Examiner* — Kevin K Pyo
(74) *Attorney, Agent, or Firm* — Winston Hsu

(57) ABSTRACT

An image processing method capable of detecting noise includes adjusting a lighting unit to acquire an over-exposure image, comparing each pixel of the over-exposure image with at least one threshold value, labeling a pixel of the over-exposure image as the noise while bright intensity of the pixel is lower than the threshold value, calculating a simulating value according to bright intensity of pixels around the noise and except the noise, and utilizing the simulating value and bright intensity of other pixels except the noise to execute a displacement detecting calculation.

15 Claims, 5 Drawing Sheets

IMAGE PROCESSING METHOD CAPABLE OF DETECTING NOISE AND RELATED NAVIGATION DEVICE

CROSS REFERENCE TO RELATED APPLICATIONS

This is a continuation in part of U.S. patent application Ser. No. 15/800,079, filed on Nov. 1, 2017, which is a continuation application of U.S. Pat. No. 9,836,132, filed on Jul. 8, 2015. The above mentioned applications are included in their entirety herein by reference.

BACKGROUND OF THE INVENTION

1. Field of the Invention

The present invention relates to an image processing method and a related navigation device, and more particularly, to an image processing method capable of detecting noise and a related navigation device with noise detection function.

2. Description of the Prior Art

A conventional optical mouse includes an optical emitter, an optical receiver and a processor disposed inside the housing. When the optical mouse moves, light emitted by the optical emitter can reflected from the table surface or the mouse pad to be received by the optical receiver, the processor analyzes the reflective light to recognize surface structural characteristic of the table surface or the mouse pad, and position variation of the surface structural characteristic within a visual field of the optical emitter can be utilized to calculate a displacement of the optical mouse. However, inner optical components (such as the lens) of the optical emitter and/or the optical receiver may be damaged or soiled to form the immovable noise within the visual field of the optical emitter, the displacement of the optical mouse may be misjudged by the processor due to the noise, and hand feeling and operational accuracy of the optical mouse is affected accordingly. Thus, design of an optical mouse with noise detecting function and having advantages of cheap material cost and preferred operational quality on the premise that has no additional physical components is an important issue in the optical navigation apparatus industry.

SUMMARY OF THE INVENTION

The present invention provides an image processing method capable of detecting noise and a related navigation device with noise detection function for solving above drawbacks.

According to the claimed invention, an image processing method capable of detecting noise includes adjusting a lighting unit to acquire an over-exposure image, comparing each pixel of the over-exposure image with at least one threshold value, labeling a pixel of the over-exposure image as the noise while bright intensity of the foresaid pixel is lower than the threshold value, calculating a simulating value according to bright intensity of pixels around the noise and except the noise, and utilizing the simulating value and bright intensity of other pixels except the noise to execute a displacement detecting calculation.

According to the claimed invention, a step of adjusting the lighting unit to acquire the over-exposure image includes increasing an exposure duration and/or an exposure intensity of the lighting unit to acquire the over-exposure image. A step of removing the noise to execute the displacement detecting calculation includes removing the noise from the over-exposure image and utilizing the over-exposure image without the noise to execute the displacement detecting calculation, or adjusting the lighting unit to acquire an non-exposure image, removing the noise from the non-exposure image and utilizing the non-exposure image without the noise to execute the displacement detecting calculation.

According to the claimed invention, the image processing method is applied to a navigation device having the lighting unit and an image capturing unit, and a step of execute the displacement detecting calculation includes utilizing the image capturing unit to respectively acquire capturing images with the same reference characteristic at different time, and recognizing position variation of the reference characteristic within the capturing images to determine a displacement of the navigation device. In addition, a step of removing the noise to execute the displacement detecting calculation includes ignoring the pixel corresponding to the noise, and executing the displacement detecting calculation by bright intensity of other pixels except the noise.

According to the claimed invention, the predetermined function calculates the simulating value according to the bright intensity of the adjacent pixels by interpolation method, or calculates a mean value or a median value of the bright intensity of the adjacent pixels to be the simulating value.

According to the claimed invention, a navigation device with noise detection function includes a lighting unit, an image capturing unit and a processing unit. The lighting unit has an adjustable shutter and/or an adjustable diaphragm. The processing unit is electrically connected to the lighting unit and the image capturing unit. The processing unit is adapted to adjust the adjustable shutter and/or the adjustable diaphragm to acquire an over-exposure image via the image capturing unit, to compare each pixel of the over-exposure image with at least one threshold value, and to label a pixel of the over-exposure image as noise while bright intensity of the foresaid pixel is lower than the threshold value, so as to calculate a simulating value according to bright intensity of pixels around the noise and except the noise, and to execute a displacement detecting calculation by utilization of the simulating value and bright intensity of other pixels except the noise.

The navigation device of the present invention can adjust the exposure duration or the exposure intensity within a specific period to acquire the over-exposure capturing image. The predetermined threshold value is compared with the whole pixels of the capturing image in sequence to recognize the noise within the capturing image. As the noise is distinguished, the bright intensity of the pixel corresponding to the noise is ignored, and the navigation device executes the displacement detecting calculation by utilization of the bright intensity of other pixels except the noise. The present invention can optionally utilize the interpolation method, the mean value calculation and the median value algorithm to simulate the bright intensity of the pixel corresponding to the noise for replacement, and the whole pixels of the capturing image can be applied to execute the displacement detecting calculation. Comparing to the prior art, the present invention does not spend expensive material cost for the additional hardware component but still maintains linear motion ability of a cursor while the noise exists, so as to enhance system convenience and market competition of the navigation device accordingly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
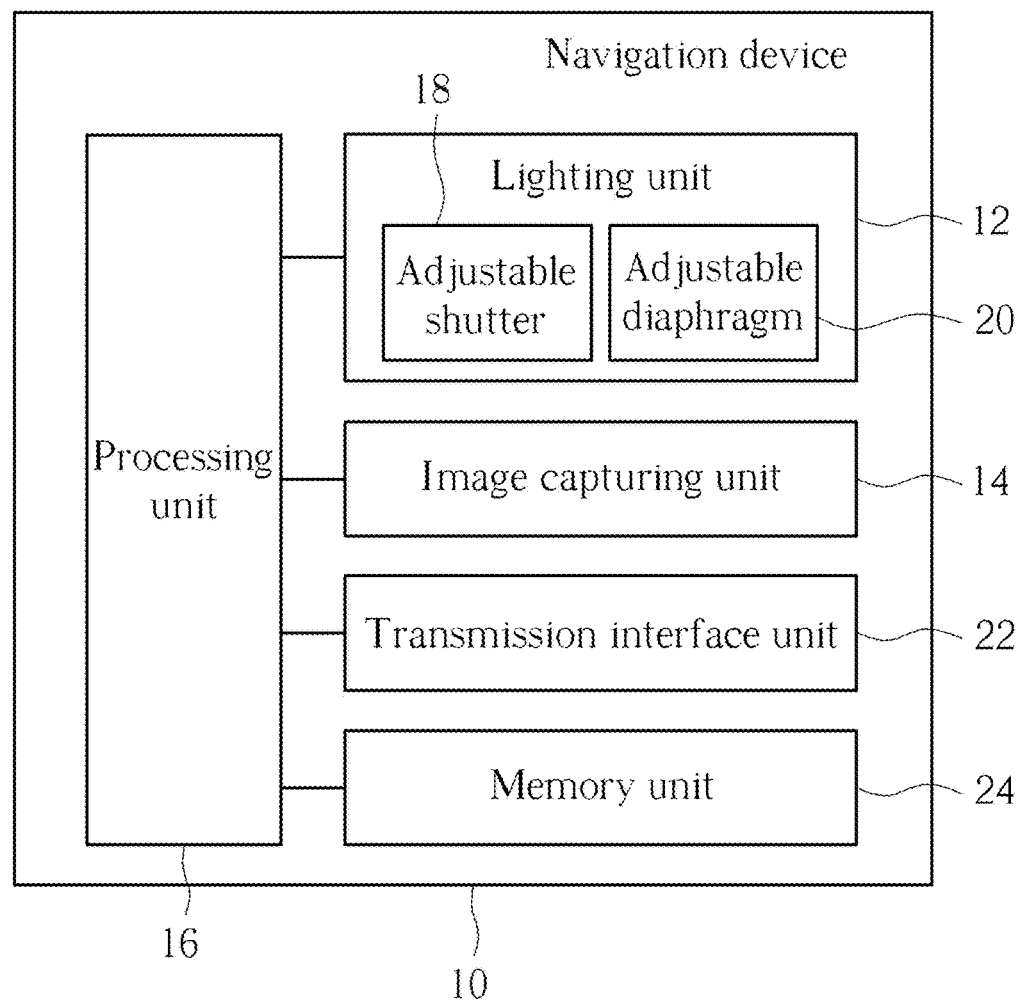
FIG. 1 is a functional block diagram of a navigation device with noise detection function according to an embodiment of the present invention.
Figure 2:
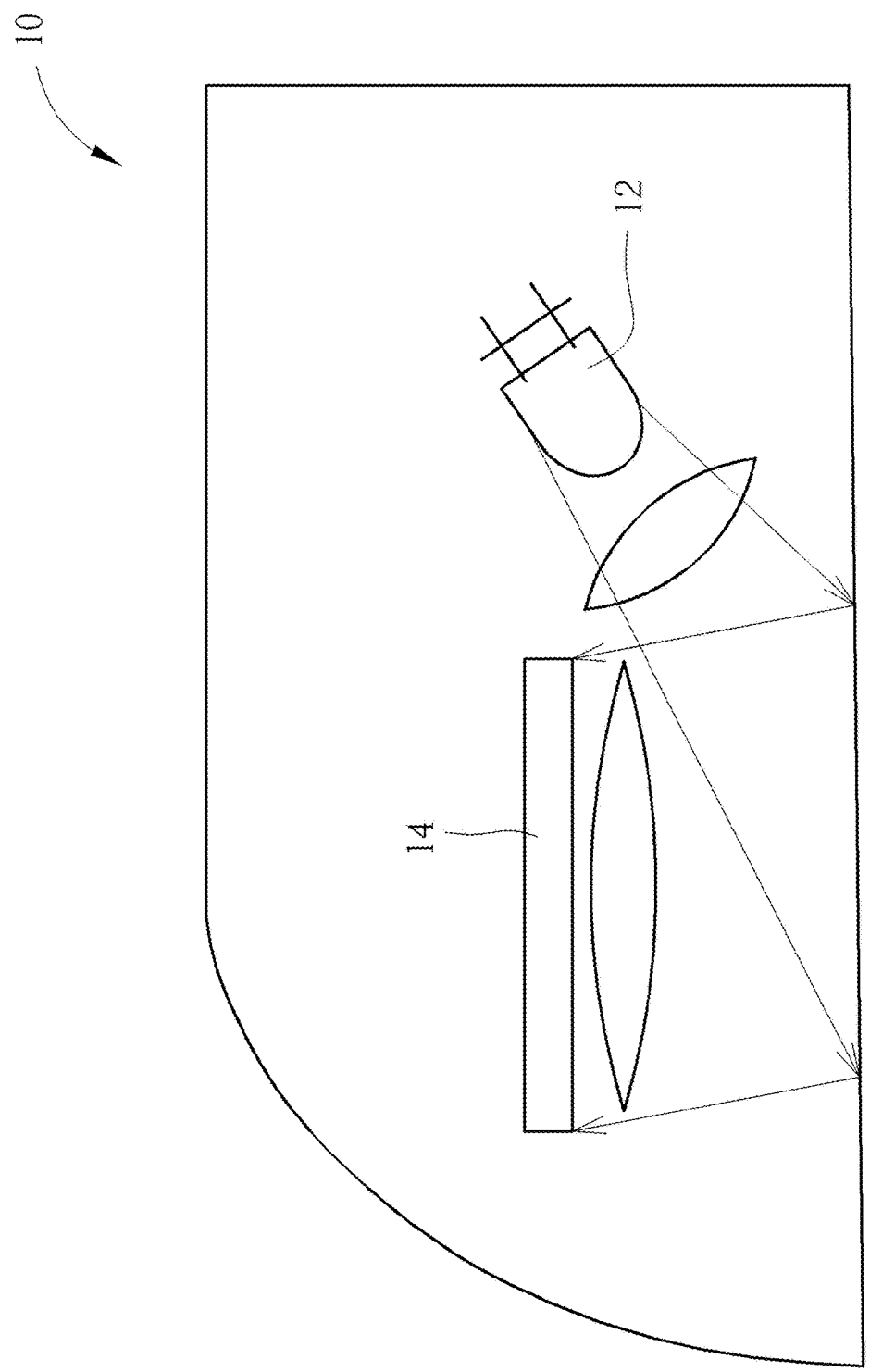
FIG. 2 is a partial diagram of the navigation device according to the embodiment of the present invention.

Please refer to FIG. 1 and FIG. 2. FIG. 1 is a functional block diagram of a navigation device 10 with noise detection function according to an embodiment of the present invention. FIG. 2 is a partial diagram of the navigation device 10 according to the embodiment of the present invention. The navigation device 10 includes a lighting unit 12, an image capturing unit 14 and a processing unit 16. The processing unit 16 is electrically connected to the lighting unit 12 and the image capturing unit 14. The processing unit 16 can adjust bright intensity of reference light by control of an adjustable shutter 18 and/or an adjustable diaphragm 20 of the lighting unit 12, and the image capturing unit 14 can acquire the image with the sufficient bright intensity. In the embodiment of the present invention, the lighting unit 12 may have several operating modes to drive the image capturing unit 14 to acquire the non-exposure image and the over-exposure image accordingly. For example, the processing unit 16 switches the lighting unit 12 into a first operating mode, the adjustable shutter 18 can be delayed to increase an exposure duration of the lighting unit 12 or the adjustable diaphragm 20 can be enlarged to increase an exposure intensity of the lighting unit 12, and the image capturing unit 14 acquires the over-exposure image. Acquirement of the over-exposure image is not limited to the above-mentioned embodiments, which depends on actual demand. While the processing unit 16 switches the lighting unit 12 into a second operating mode, the adjustable shutter 18 can be speeded or the adjustable diaphragm 20 can be reduced, and the image capturing unit 14 acquires the non-exposure image.

In displacement detecting procedure of the navigation device 10, the processing unit 16 drives the image capturing unit 14 to respectively acquire capturing images at different time. At least one reference characteristic exists in a visual field of the image capturing unit 14, and the at least one reference characteristic is captured within the capturing images acquired at the different time as mentioned above. The processing unit 16 can recognize position variation of the reference characteristic within the capturing images to determine the displacement of the navigation device 10 accordingly. As the capturing image has immovable noise (the noise may be formed on lens of the lighting unit 12 and/or the image capturing unit 14 probably), the processing unit 16 cannot distinguish the noise from the reference characteristic, which results in the failed displacement detecting calculation. Therefore, the navigation device 10 of the present invention generates the over-exposure image by high illumination background, the reference characteristic within the capturing image is diluted but the noise is still readable, the noise can be recognized within the capturing image, and position of the noise can be determined accordingly to ensure that the displacement detecting calculation is executed without interference of the noise.

The navigation device 10 may further include a transmission interface unit 22 and a memory unit 24 respectively connected to the processing unit 16. While the processing unit 16 acquires the correct displacement of the navigation device 10 by the over-exposure image, displacement information is transmitted to an external host via the transmission interface unit 22, and the external host can determine a control command input by the user according to the displacement information, so as to actuate the corresponding application programs. The memory unit 24 can store a threshold value for a comparison with the noise, and a comparison result executed by the processing unit 16. The threshold value may be varied according to properties of the lighting unit 12 and/or the image capturing unit 14 actively or passively, and a detailed description is omitted herein for simplicity. The processing unit 16 compares each pixel of the over-exposure image with the threshold value to determine whether the over-exposure image has the noise, and position of the noise within the image can be labeled accordingly.

Figure 3:
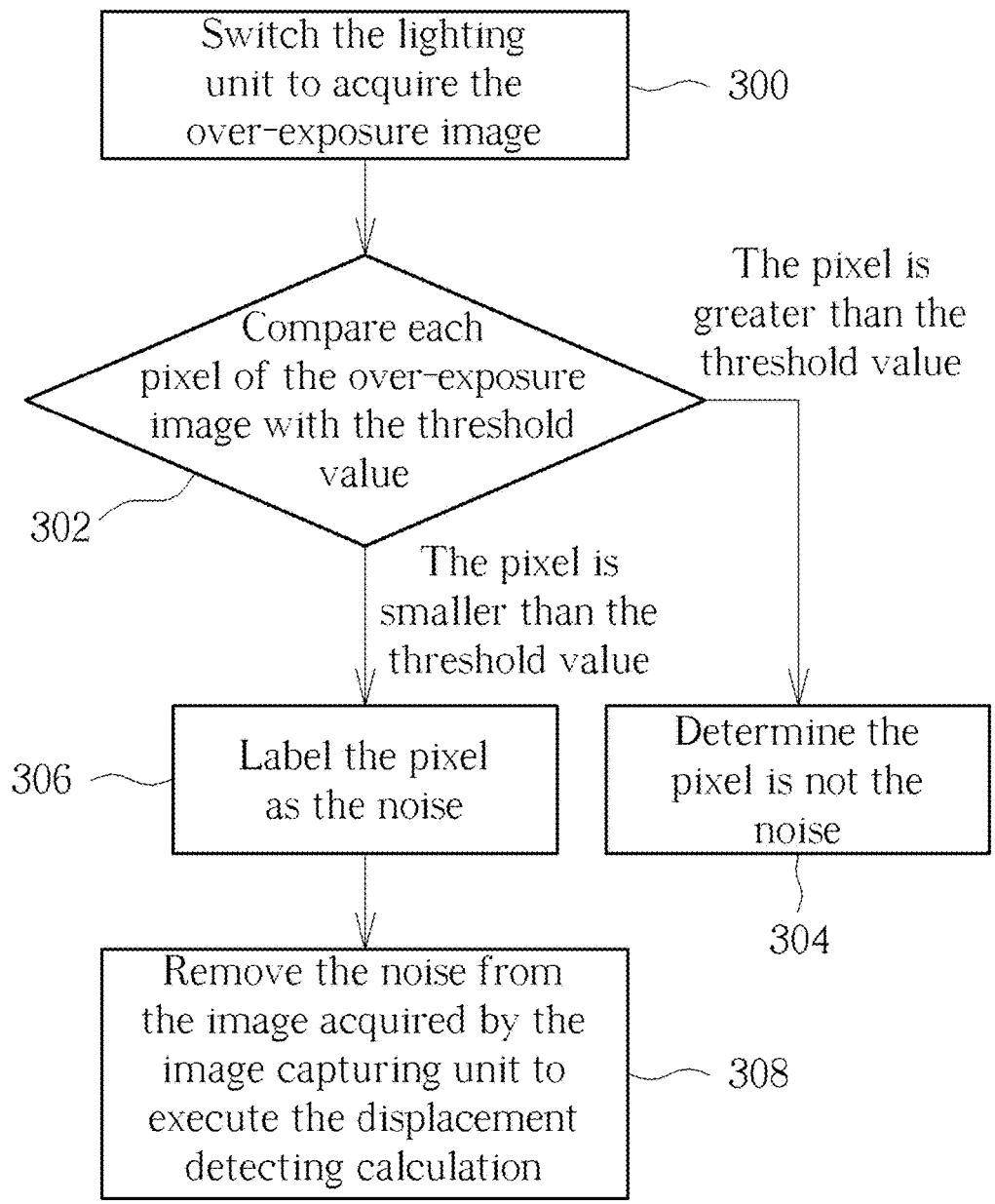
FIG. 3 is a flow chart of utilizing the over-exposure image to detect the noise according to the embodiment of the present invention.
Figure 6:
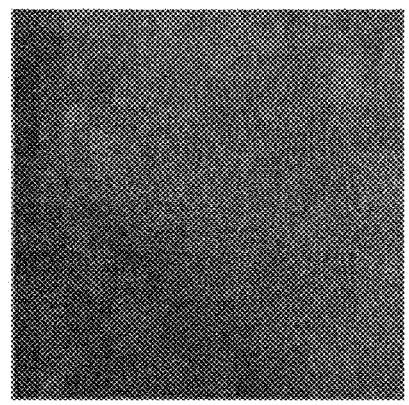
FIG. 6 is a diagram of the capturing image without the noise according to the embodiment of the present invention.
Figure 5:
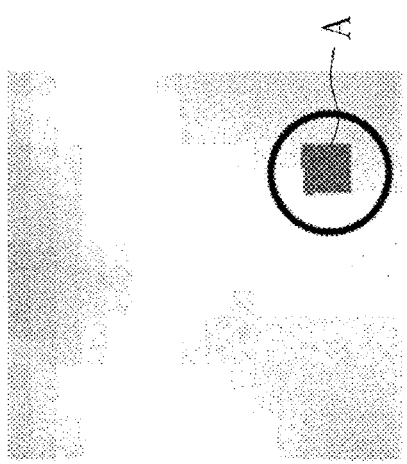
FIG. 5 is a diagram of the over-exposure image having the noise according to the embodiment of the present invention.
Figure 4:
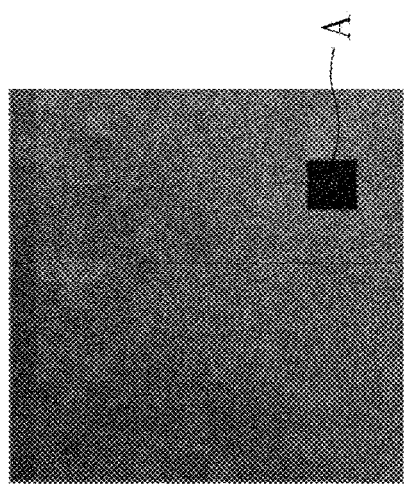
FIG. 4 is a diagram of the non-exposure image having the noise according to the embodiment of the present invention.
Figure 7:
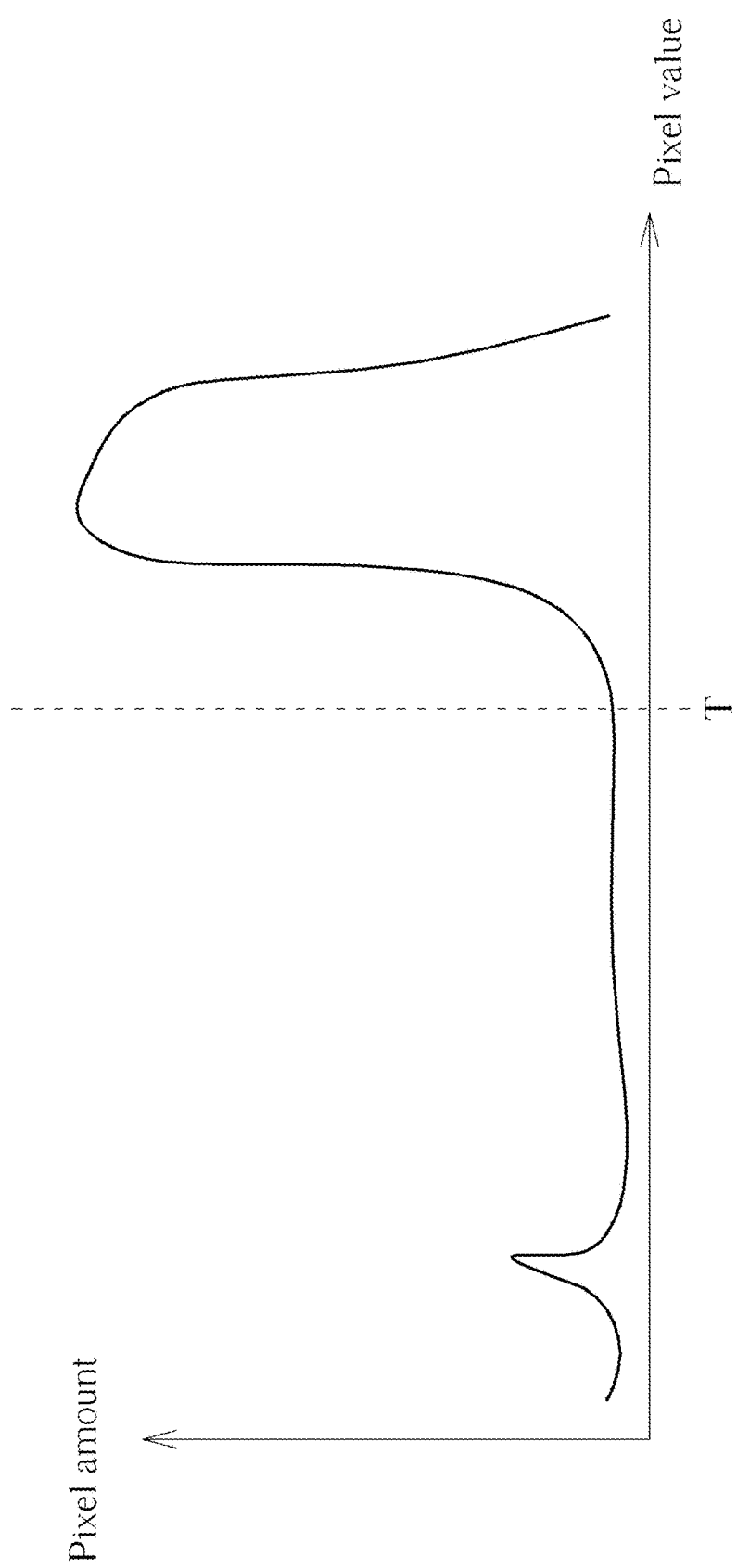
FIG. 7 is a distribution diagram of pixels of the over-exposure image shown in FIG. 5.

Please refer to FIG. 3 to FIG. 7. FIG. 3 is a flow chart of utilizing the over-exposure image to detect the noise according to the embodiment of the present invention. FIG. 4 is a diagram of the non-exposure image I1 having the noise according to the embodiment of the present invention. FIG. 5 is a diagram of the over-exposure image I2 having the noise according to the embodiment of the present invention. FIG. 6 is a diagram of the capturing image I3 without the noise according to the embodiment of the present invention. FIG. 7 is a distribution diagram of pixels of the over-exposure image I2 shown in FIG. 5. The image processing method illustrated in FIG. 3 is suitable for the navigation device 10 shown in FIG. 1 and FIG. 2. The horizontal axis and longitudinal axis shown in FIG. 7 respectively represent the pixel value (bright intensity) and the pixel amount. While the lighting unit 12 is switched to the second operating mode, the image capturing unit 14 acquires the non-exposure image I1, and the noise A is difficultly distinguished from the reference characteristic (the pixels except the noise A) as shown in FIG. 4, so that the image processing method of the present invention is executed to accurately recognize the noise A.

First, step 300 is executed and the processing unit 16 switches the lighting unit 12 into the first operating mode to acquire the over-exposure image I2. The lighting unit 12 is adjusted to increase background intensity of the image capturing unit 14 by adjustment of the exposure duration and/or the exposure intensity. As shown in FIG. 4 and FIG. 5, difference between the noise A and the reference characteristic (any pixels within the image I1 except the noise A can be represented as the reference characteristic) of the non-exposure image I1 is not apparent, and the noise A which is marked by a circle shown in FIG. 5 becomes clear while the reference characteristic of the over-exposure image I2 is diluted. Then, step 302 is executed to compare each pixel of the over-exposure image I2 with the threshold value T by the processing unit 16. At least one threshold value T is stored in the memory unit 24 to distinguish the darker noise A from the lighter reference characteristic. As the memory unit 24 stores a plurality of threshold values T, the processing unit 16 can provide the appropriate calculating function according to different threshold regions where the noise A is located. Application of the noise detecting technology for multi-threshold is not limited to the above-mentioned embodiment, which depends on design demand.

While the bright intensity of a pixel within the over-exposure image I2 is greater than the threshold value T, step 304 is executed to determine the foresaid pixel is not the noise. While the bright intensity of a pixel within the over-exposure image I2 is lower than the threshold value T, step 306 is executed to label the foresaid pixel (whose bright intensity is lower than the threshold value T) as the noise A by the processing unit 16. Generally, the processing unit 16 scans the whole pixels of the over-exposure image I2 to generalize correct position of the noise A within the over-exposure image I2. Scanning result can be stored inside the memory unit 24 by the processing unit 16 since steps 304 and 306 are finished, and the correct position of the noise A is decided by integral scanning of the whole over-exposure image I2. Actual application of the image scanning procedure is not limited to the above-mentioned embodiments, which depends on design demand. Final, step 308 is executed to remove failed information of the noise A by the processing unit 16 because the noise A does not correctly represent the displacement of the navigation device 10, and other valid pixels (which means the pixels except the noise A) can be utilized to execute the displacement detecting calculation of the navigation device 10.

In step 308, the navigation device 10 can use the over-exposure image I2 to execute the displacement detecting calculation while the noise A is removed from the over-exposure image. Further, the navigation device 10 can find out the noise A by the over-exposure image I2, and labels the position of the noise A and generate the non-exposure image I1. The bright intensity of the pixel on the labeled position (whereon the noise A is located) is removed from the non-exposure image I1, and the capturing image I3 without the noise A can be acquired to execute the displacement detecting calculation. Besides, the present invention provides several method of removing the noise A. For instance, when the processing unit 16 labels the position corresponding to the noise A within the over-exposure image I2, the pixel corresponding to the noise A is ignored from the processed image (which can be the non-exposure image I1 or the over-exposure image I2) no matter the non-exposure image I1 or the over-exposure image I2 is applied to execute the displacement detecting calculation, and the processing unit 16 is able to aim at the bright intensity of other pixels except the noise A for the displacement detecting calculation.

Another method of removing the noise A is that the processing unit 16 labels the position corresponding to the noise A within the over-exposure image I2, and finds out pixels adjacent to the noise A within the processed image (which can be the non-exposure image I1 or the over-exposure image I2). A predetermined function which may be stored inside the memory unit 24 is utilized to calculate a simulating value by the bright intensity of the adjacent pixels, the bright intensity of the pixel corresponding to the noise A is replaced by the simulating value, and the displacement detecting calculation can be executed by utilization of the simulating value and the bright intensity of other pixels except the noise A. The predetermined function can calculate the simulating value according to the bright intensity of the adjacent pixels by interpolation method, or calculate a mean value or a median value of the bright intensity of the adjacent pixels to be the simulating value. Calculation of the simulating value is not limited to the above-mentioned embodiments, which depends on design demand.

In conclusion, the navigation device of the present invention can adjust the exposure duration or the exposure intensity within a specific period to acquire the over-exposure capturing image. The predetermined threshold value is compared with the whole pixels of the capturing image in sequence to recognize the noise within the capturing image. As the noise is distinguished, the bright intensity of the pixel corresponding to the noise is ignored, and the navigation device executes the displacement detecting calculation by utilization of the bright intensity of other pixels except the noise. The present invention can optionally utilize the interpolation method, the mean value calculation and the median value algorithm to simulate the bright intensity of the pixel corresponding to the noise for replacement, and the whole pixels of the capturing image can be applied to execute the displacement detecting calculation. Comparing to the prior art, the present invention does not spend expensive material cost for the additional hardware component but still maintains linear motion ability of a cursor while the noise exists, so as to enhance system convenience and market competition of the navigation device accordingly.

The present invention aims at identify the noise, which means to find out at least one particular point among many data points. That means the present invention is a kind of neural network learning method, and the present convolutional neural network can be applied in the present invention to identify the noise. There are several commonly used architectures for the convolutional neural networks. The classic network architectures of CNN can include LeNet, AlexNet, and VGGNet. The modern network architectures of CNN can include Inception, ResNet, and DenseNet. Any of the convolutional neural networks of VGGNet, ResNet, and Inception may choose one pixel within the image and pixels around the chosen pixel to define an N×N matrix. N is named the Kernal size. All pixels of the N×N matrix are weighted individually, and a sum of the weighted pixels is an output of the chosen pixel. Other pixels within the image are executed by foresaid steps and thereby the noise formed by the dark pixels can be distinguished.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method capable of detecting noise, comprising:
adjusting a lighting unit to acquire an over-exposure image;
comparing each pixel of the over-exposure image with at least one threshold value;
labeling a pixel of the over-exposure image as the noise while bright intensity of the foresaid pixel is lower than the threshold value;
calculating a simulating value according to bright intensity of pixels around the noise and except the noise; and utilizing the simulating value and bright intensity of other pixels except the noise to execute a displacement detecting calculation;

wherein a computation step for labeling the noise is configured to identify the noise by one of the convolutional neural networks of VGGNet, ResNet, and Inception.

2. The image processing method of claim 1, wherein adjusting the lighting unit to acquire the over-exposure image comprises:

increasing an exposure duration and/or an exposure intensity of the lighting unit to acquire the over-exposure image.

3. The image processing method of claim 1, wherein executing the displacement detecting calculation comprises:

removing the noise from the over-exposure image; and
utilizing the over-exposure image without the noise to execute the displacement detecting calculation.

4. The image processing method of claim 1, wherein executing the displacement detecting calculation comprises:

adjusting the lighting unit to acquire an non-exposure image;
removing the noise from the non-exposure image; and
utilizing the non-exposure image without the noise to execute the displacement detecting calculation.

5. The image processing method of claim 1, wherein the image processing method is applied to a navigation device having the lighting unit and an image capturing unit, and executing the displacement detecting calculation comprises:

utilizing the image capturing unit to respectively acquire capturing images with the same reference characteristic at different time; and
recognizing position variation of the reference characteristic within the capturing images to determine a displacement of the navigation device.

6. The image processing method of claim 1, wherein executing the displacement detecting calculation comprises:

ignoring the pixel corresponding to the noise; and
executing the displacement detecting calculation by bright intensity of other pixels except the noise.

7. The image processing method of claim 1, wherein the predetermined function calculates the simulating value according to the bright intensity of the adjacent pixels by interpolation method, or calculates a mean value or a median value of the bright intensity of the adjacent pixels to be the simulating value.

8. A navigation device with noise detection function, comprising:

a lighting unit, having an adjustable shutter and/or an adjustable diaphragm;
an image capturing unit; and
a processing unit electrically connected to the lighting unit and the image capturing unit, the processing unit being adapted to adjust the adjustable shutter and/or the adjustable diaphragm to acquire an over-exposure image via the image capturing unit, to compare each pixel of the over-exposure image with at least one threshold value, and to label a pixel of the over-exposure image as noise while bright intensity of the foresaid pixel is lower than the threshold value, so as to calculate a simulating value according to bright intensity of pixels around the noise and except the noise, and to execute a displacement detecting calculation by utilization of the simulating value and bright intensity of other pixels except the noise;

wherein a computation step for labeling the noise is configured to identify the noise by one of the convolutional neural networks of VGGNet, ResNet, and Inception.

9. The navigation device of claim 8, wherein the processing unit delays the adjustable shutter to increase an exposure duration of the lighting unit, or enlarges the adjustable diaphragm to increase an exposure intensity of the lighting unit.

10. The navigation device of claim 8, wherein the lighting unit has a first operating mode and a second operating mode, and the processing unit switches the lighting unit into the first operating mode to acquire the over-exposure image.

11. The navigation device of claim 8, wherein the processing unit removes the noise from the over-exposure image, and utilizes the over-exposure image without the noise to execute the displacement detecting calculation.

12. The navigation device of claim 10, wherein the processing unit further switches the lighting unit into the second operating mode to acquire a non-exposure image, and removes the noise from the non-exposure image to execute the displacement detecting calculation by the non-exposure image without the noise.

13. The navigation device of claim 8, wherein the processing unit utilizes the image capturing unit to respectively acquire capturing images with the same reference characteristic at different time, and recognizes position variation of the reference characteristic within the capturing images to determine a displacement of the navigation device.

14. The navigation device of claim 8, wherein the pixel corresponding to the noise is ignored, and the displacement detecting calculation is executed by bright intensity of other pixels except the noise.

15. The navigation device of claim 8, wherein the predetermined function calculates the simulating value according to the bright intensity of the adjacent pixels by interpolation method, or calculates a mean value or a median value of the bright intensity of the adjacent pixels to be the simulating value.

* * * * *